United States Patent [19]

Isaka et al.

[11] Patent Number: 4,484,650

[45] Date of Patent: Nov. 27, 1984

[54] MOTORCYCLE MOUNTED WITH V SHAPED ENGINE

[75] Inventors: Yoshiharu Isaka; Yukiharu Hosoi, both of Shizuoka, Japan

[73] Assignee: Yamaha Hatsudoki Kabushiki Kaisha, Iwata, Japan

[21] Appl. No.: 431,624

[22] Filed: Sep. 30, 1982

[30] Foreign Application Priority Data

Dec. 11, 1981 [JP] Japan .................................. 56-198482

[51] Int. Cl.³ .......................... B62D 61/02; F01N 7/08
[52] U.S. Cl. ..................................... 180/219; 180/227
[58] Field of Search ............... 180/219, 225, 226, 227; 280/284; 60/313; 123/52 MV

[56] References Cited

U.S. PATENT DOCUMENTS

| Re. 27,788 | 10/1973 | Wendt ................................. | 180/227 |
| 4,226,296 | 10/1980 | Higaki ................................. | 180/219 |
| 4,327,811 | 5/1982 | Isaka ................................... | 180/219 |
| 4,359,865 | 11/1982 | Nakao et al. ....................... | 180/219 |
| 4,422,519 | 12/1983 | Nomura et al. .................... | 180/226 |

Primary Examiner—David M. Mitchell
Assistant Examiner—D. Lynn Fugate
Attorney, Agent, or Firm—Ernest A. Beutler

[57] ABSTRACT

An exhaust and rear suspension system for a motorcycle that permits a compact, easily serviced arrangement. The engine is of the V type and has a bank of cylinders with rearwardly facing exhaust ports. The rear wheel is suspended by a pair of spaced apart trailing arms having independent forward pivot axes that define a gap therebetween through which exhaust pipes extend from the rearwardly facing exhaust ports.

16 Claims, 4 Drawing Figures

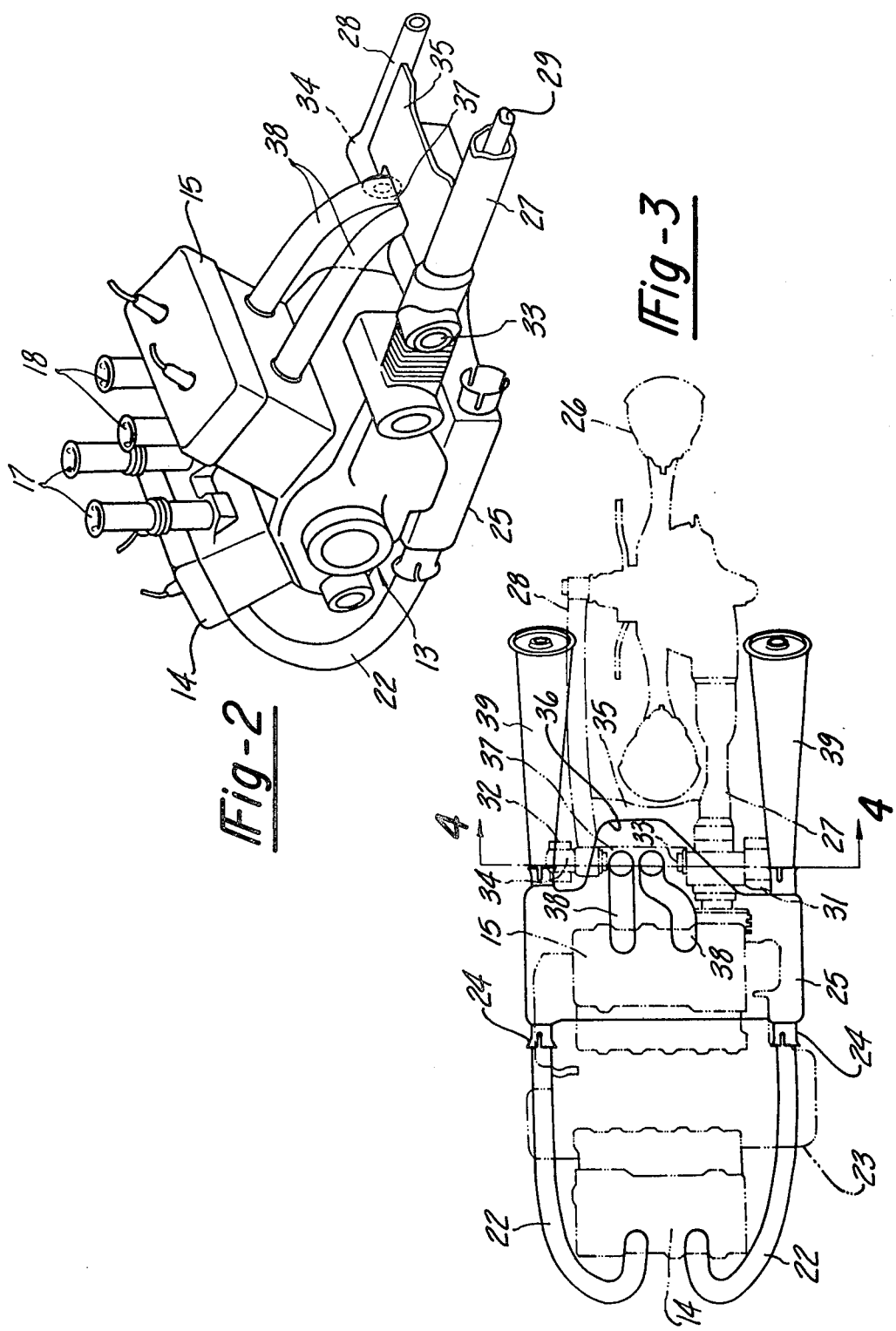

4,484,650

MOTORCYCLE MOUNTED WITH V SHAPED ENGINE

BACKGROUND OF THE INVENTION

This invention relates to a motorcycle mounted with a V shaped engine and more particularly to an improved exhaust arrangement for a motorcycle with an engine having a rearwardly directed exhaust port.

In many types of motorcycles, an engine is employed that has a rearwardly directed exhaust port. For example, motorcycles having V type engines with the crankshaft mounted transversely to the longitudinal direction of the motorcycle normally have at least the exhaust ports of the rear bank of cylinders extending in a rearward direction. It is a common practice in motorcycle construction to employ a rear wheel suspension in which the rear wheel is suspended for pivotal movement by means of a pair of trailing arms, one at each side of the motorcycle. The forward pivot point of the trailing arms is disposed closely adjacent the rear of the engine so as to maintain a relatively short wheel base for the motorcycle. In some applications, therefore, it is necessary to route the exhaust pipe from the rearwardly facing exhaust port downwardly through the area of the rear of the pivot axis of the trailing arms and forwardly of the rear wheel. In order to permit sufficient clearance for suspension travel, this exhaust pipe routing has necessitated a longer than desired wheel base for the motorcycle. In addition, when the motorcycle is serviced and the rear wheel and rear wheel suspension is removed, it has been necessary to remove the exhaust pipe with arrangements of this type. Alternatively, the pivot axis for the rear trailing arms may be moved rearwardly sufficiently so that the exhaust pipe may pass downwardly between the engine and the forwardmost portion of the pivot axis. Of course, this arrangement may unnecessarily lengthen the wheel base of the motorcycle.

It is, therefore, a principal object of this invention to provide an improved arrangement of the exhaust and rear suspension systems of a motorcycle having an engine with a rearwardly directed exhaust port.

It is another object of this invention to provide a motorcycle construction that permits a compact arrangement and yet which facilitates servicing.

SUMMARY OF THE INVENTION

This invention is adapted to be embodied in a motorcycle having a frame, an engine with at least one cylinder having a rearwardly facing exhaust port, a rear wheel, and a pair of spaced apart suspension arms suspending the rear wheel for pivotal movement relative to the frame. In accordance with the invention, the arms are pivotally supported by the frame by independent, spaced apart pivots with a gap therebetween. An exhaust pipe extends from the exhaust port through the gap between the independent pivots.

BRIEF DESCRIPTION OF THE DRAWINGS

FIG. 2 is a perspective view of the portion of the motorcycle including the engine exhaust system and forward portion of the rear wheel support.

FIG. 3 is a top plan view of the motorcycle with portions shown in phantom.

DETAILED DESCRIPTION OF THE PREFERRED EMBODIMENT

Figure 1:
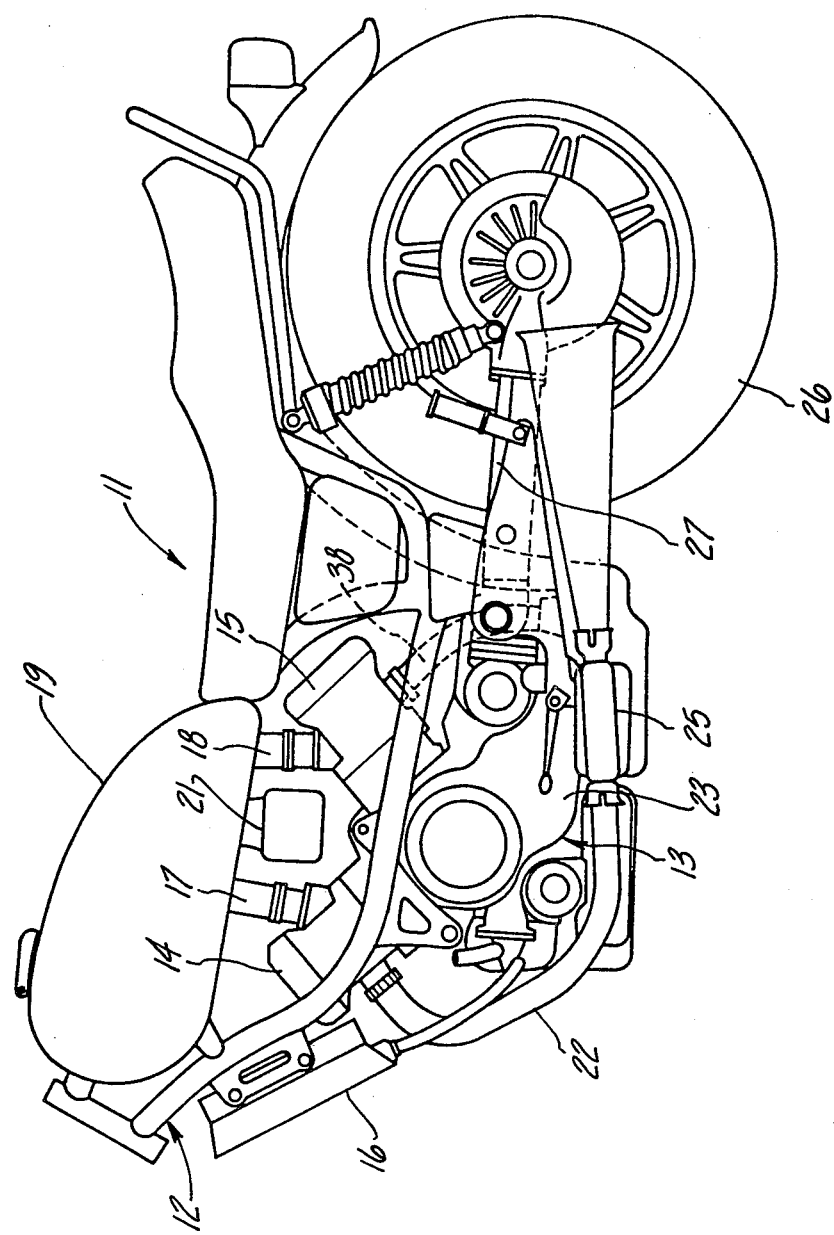
FIG. 1 is a side elevational view of a portion of a motorcycle constructed in accordance with this invention.
Figure 4:
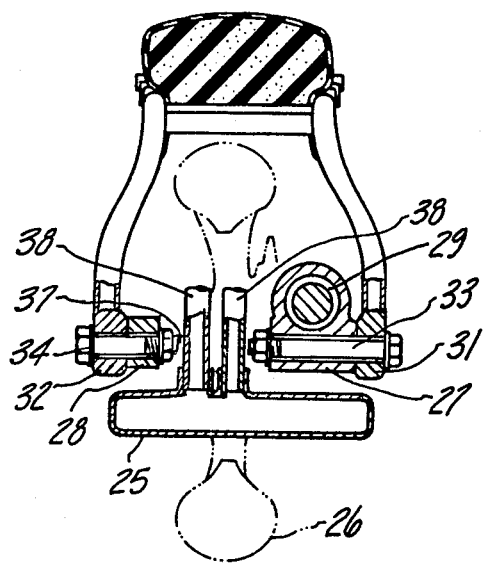
FIG. 4 is a cross-sectional view taken along the line 4—4 of FIG. 3.

A motorcycle constructed in accordance with this invention is illustrated partially and is identified generally by the reference numeral 11. In the drawings and specifically in FIG. 1, the front wheel, front wheel suspension and handlebar assembly has not been illustrated since this portion of the motorcycle forms no part of the invention.

The motorcycle 11 includes a frame assembly, indicated generally by the reference numeral 12 in which an engine, indicated generally by the reference numeral 13, is supported in a known manner. The engine 13 is of the V type and is disposed with its crankshaft extending transversely of the motorcycle 11. As a result, the engine 13 has a forwardly disposed bank of cylinders 14 and a rearwardly disposed bank of cylinders 15. In the preferred embodiment of the invention as illustrated, each bank of cylinders 14 and 15 includes two cylinders. Therefore, the engine is of the V four type. The engine is water-cooled and for that purpose a cooling radiator 16 is supported at the upper portion of the frame assembly 12.

Each cylinder of the front back 14 is provided with a respective intake pipe 17 which may include a carburetor and which extends generally vertically upwardly in the valley between the V of the engine. In a like manner, each of the cylinders of the rear bank 15 is also provided with a respective upwardly directed intake pipe 18 which may also include a carburetor. The intake pipes 17 and 18 extend upwardly into a recess formed in a saddle type fuel tank 19 that is supported in a known manner by the frame assembly 12. An intake device may be positioned in this recess and which communicates with an inlet 21 that also extends into the V between the cylinder banks 14 and 15.

The exhaust ports of the forward bank 14 extend forwardly and are served by respective exhaust pipes 22 that extend downwardly and outwardly toward the sides of the motorcycle beneath a combined crankcase and transmission 23 of the engine 13. The exhaust pipes 22 each terminate at respective inlets 24 formed at the outer sides of an exhaust expansion device 25 that extends transversely across the motorcycle 11 and beneath the rearward portion of the combined crankcase and transmission assembly 23. The device 25 may comprise purely an expansion chamber or, alternatively, may serve this function as well as some additional muffling function to that achieved by the expansion chamber.

The exhaust ports of the rear bank of cylinders 15 face rearwardly. Therefore, in order to route the exhaust pipes from these exhaust ports to the expansion chamber 25 for eventual discharge to the atmosphere, the exhaust pipes must be located so as to not interfere with the suspension system for the rear wheel, to be described, and also to provide for easy servicing. The rear suspension system is, therefore, designed to achieve this result in accordance with the invention.

A rear wheel 26 is rotatably supported at the rear end of a pair of trailing arms 27 and 28. The illustrated embodiment, the rear wheel 26 is shaft driven by means of a drive shaft 29 that passes through the hollow interior of the arm 27.

Conventionally, it has been the practice to join the arms 27 and 28 at their forward point and to provide a single transversely extending pivot for these arms. With such an arrangement, the exhaust pipes from the rear bank of cylinders 15 must pass either forwardly of the connecting pivot or rearwardly of it. If the exhaust pipes pass forwardly of the rear pivot for the arms 27 and 28, the wheel base may be increased excessively. If, on the other hand, the exhaust pipes pass rearwardly of this pivot, the wheel base is still lengthened because the exhaust pipes must clear the rear wheel 26 and allow for suspension travel. In addition, servicing is rendered difficult because it is necessary to remove these rear exhaust pipes before the rear wheel 26 and suspension arms 27 and 28 may be removed.

In accordance with this invention, an arrangement is provided wherein the exhaust pipes may be conveniently located without lengthening the wheel base and without interfering with the servicing of the motorcycle. To this end, the frame assembly 12 is provided with a pair of laterally spaced portions 31 and 32 that are disposed at opposite sides of the motorcycle. The portions 31 and 32 carry respective pivot pins 33 and 34 that journal the forwardmost portion of the arms 27 and 28, respectively. A universal joint (not shown) for the drive shaft 29 is disposed so that it lies at the pivot axis 33 so as to accommodate the suspension movement about this pivot axis. The arms 27 and 28 are interconnected at their forward ends by means of a gusset plate 35. The forward end of the gusset plate 35 is formed with a relief 36 and the pivot shafts 33 and 34 terminate at a spaced distance from each other in proximity to this relief by means of a gap, introduced generally by the reference numeral 37.

A pair of exhaust pipes 38 extend from each of the exhaust ports of the rear bank 15 downwardly through the gap 37 and in substantial alignment with the pivot axes defined by the pivot pins 33 and 34. The exhaust pipes 38 terminate in suitable inlets to the expansion chamber device 25. Because of the existence of the gap 37 and the passage of the exhaust pipes 38 through this gap, it should be readily apparent that the construction permits placement of the rear exhaust pipes without necessitating lengthening the wheel base of the motorcycle 11. In addition, the passage of the exhaust pipes 38 through the gap 37 permits the rear wheel 26 and suspension arms 27 and 28 to be removed from the motorcycle without necessitating removal of the exhaust pipes 38.

A pair of combined tailpipe and muffler assemblies 39 extend rearwardly from the exhaust expansion device 25 so as to discharge the exhaust gases from all of the exhaust pipes 22 and 38 to the atmosphere. These exhaust pipes and mufflers 39 extend on opposite sides of the rear wheel 26.

It should be readily apparent from the foregoing description that an extremely effective and yet compact exhaust and suspension arrangement is provided for a motorcycle having a V type engine. The arrangement permits compactness while at the same time avoiding difficulties in servicing. Although the invention has been described in conjunction with a V type engine, it should be understood that it may also be employed with an in-line engine or a single cylinder engine in which the exhaust port of the cylinders faces rearwardly although the invention has particularly utility in conjunction with V type engines which present significantly greater problems in connection with exhaust routing. Various other changes and modifications may be made without departing from the spirit and scope of the invention, as defined by the appended claims.

We claim:

1. In a motorcycle having a frame, an engine with at least one cylinder having a rearwardly facing exhaust port, a rear wheel, and a pair of spaced apart suspension arms suspending said rear wheel for pivotal movement relative to said frame and an exhaust device extending transversely across said frame in proximity to and below the forward ends of said suspension arms, the improvement comprising said arms being pivotally supported by said frame by independent spaced apart pivots with a gap therebetween and an exhaust pipe extending from said exhaust port through said gap and terminating in said exhaust device.

2. In a motorcycle as set forth in claim 1 wherein the arms are rigidly connected together by means of a connecting plate adjacent their forward ends, said connecting plate having a recess formed in proximity to the gap and through which the exhaust pipe extends.

3. In a motorcyle as set forth in claim 1 wherein the engine has a plurality of aligned cylinders having rearwardly facing exhaust ports and individual exhaust pipes extending from each of said exhaust ports through said gap and into the exhaust device.

4. In a motorcycle as set forth in claim 3 wherein the engine is of the V type and the cylinders having rearwardly facing exhaust ports from a rear bank of the V, there being aligned cylinders of a forward bank of the V having forwardly facing exhaust ports and exhaust pipes extending from the forwardly facing exhaust ports downwardly and outwardly and terminating in the exhaust device.

5. In a motorcycle as set forth in claim 4 wherein an induction system is provided for the engine in the valley of the V.

6. In a motorcycle as set forth in claim 5 wherein the exhaust device comprises an expansion chamber device extending transversely across the motorcycle and positioned beneath a portion of the engine.

7. In a motorcycle as set forth in claim 6 further including a shaft drive for driving the rear wheel and passing through one of the arms.

8. In a motorcycle as set forth in claim 1 wherein the engine is of the V type with a transversely extending crankshaft, the one cylinder being a rear cylinder of the V.

9. In a motorcycle as set forth in claim 8 wherein a front cylinder bank has a forwardly facing exhaust port and including a front exhaust pipe extending from said forwardly extending exhaust port and terminating in the exhaust device.

10. In a motorcycle as set forth in claim 9 wherein the exhaust device is positioned beneath the engine and has at least one outlet at one side of the rear wheel.

11. In a motorcycle as set forth in claim 10 wherein the arms are rigidly connected together by means of a connecting plate adjacent their forward ends, said connecting plate having a recess formed in proximity to the gap and through which the rear exhaust pipe extends.

12. In a motorcycle as set forth in claim 11 further including a drive shaft for driving the rear wheel, said drive shaft being positioned in one of said suspension arms.

13. A motorcycle as set forth in claim 1 wherein the exhaust device has at least one outlet disposed at one side of the rear wheel.

14. A motorcycle as set forth in claim 13 wherein the exhaust device has a pair of outlets each formed on a respective side of the rear wheel.

15. A motorcycle as set forth in claim 5 wherein the exhaust device has a pair of outlets each formed on a respective side of the rear wheel.

16. A motorcycle as set forth in claim 9 wherein the exhaust device has a pair of outlets each formed on a respective side of the rear wheel.

* * * * *